United States Patent
Nagata et al.

(10) Patent No.: US 10,035,488 B2
(45) Date of Patent: Jul. 31, 2018

(54) AIRBAG APPARATUS

(71) Applicant: TOYODA GOSEI CO., LTD., Kiyosu-shi, Aichi-ken (JP)

(72) Inventors: Matsuo Nagata, Kiyosu (JP); Kazuaki Bito, Kiyosu (JP); Akira Suzuki, Kiyosu (JP); Koji Shibayama, Kiyosu (JP); Akihisa Tange, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 11 days.

(21) Appl. No.: 15/602,441

(22) Filed: May 23, 2017

(65) Prior Publication Data
US 2017/0349135 A1 Dec. 7, 2017

(30) Foreign Application Priority Data

Jun. 3, 2016 (JP) .................. 2016-111938

(51) Int. Cl.
*B60R 21/239* (2006.01)
*B60R 21/207* (2006.01)
*B60R 21/217* (2011.01)

(52) U.S. Cl.
CPC .......... *B60R 21/239* (2013.01); *B60R 21/207* (2013.01); *B60R 21/2171* (2013.01)

(58) Field of Classification Search
CPC ............... B60R 21/239; B60R 21/207; B60R 21/23138; B60R 2021/23146; B60R 21/2171
See application file for complete search history.

(56) References Cited

U.S. PATENT DOCUMENTS

| 7,168,733 | B2* | 1/2007 | Kumagai | B60R 21/207 |
| | | | | 280/730.2 |
| 7,226,077 | B2* | 6/2007 | Abe | B60R 21/206 |
| | | | | 280/728.1 |
| 7,396,042 | B2* | 7/2008 | Mabuchi | B60R 21/2171 |
| | | | | 280/730.2 |
| 7,431,329 | B2* | 10/2008 | Taguchi | B60R 21/23138 |
| | | | | 280/729 |

(Continued)

FOREIGN PATENT DOCUMENTS

| JP | 2013-086731 A | 5/2013 | |
| JP | 2014-069585 A | 4/2014 | |
| WO | WO-2009071225 A1 * | 6/2009 | ......... B60R 21/2171 |

*Primary Examiner* — Paul N Dickson
*Assistant Examiner* — Joselynn Y Sliteris
(74) *Attorney, Agent, or Firm* — Posz Law Group, PLC

(57) ABSTRACT

An airbag apparatus includes a gas generator main body and an airbag. The gas generator main body includes a gas outlet portion, which includes gas discharging holes, and a non-outlet portion. The airbag includes an inflation portion, which is inflated by inflation gas, and a storage chamber, which is arranged outside the inflation portion and stores the gas generator main body. The storage chamber includes an insertion port for inserting the gas generator main body and a partition wall. The partition wall includes a pass-through portion through which the non-outlet portion is passed. The partition wall separates the storage chamber and the inflation portion from each other and restricts leakage of inflation gas in the inflation portion to the storage chamber through the gap between inner wall surface of the pass-through portion and the non-outlet portion.

9 Claims, 10 Drawing Sheets

(56) References Cited

U.S. PATENT DOCUMENTS

| | | | |
|---|---|---|---|
| 7,637,530 B2 * | 12/2009 | Yamaji | B60R 21/23138 280/730.2 |
| 8,047,570 B2 * | 11/2011 | Feller | B60R 21/239 280/728.2 |
| 8,448,981 B2 * | 5/2013 | Fukawatase | B60R 21/207 280/730.2 |
| 8,628,111 B2 * | 1/2014 | Sugimoto | B60R 21/207 280/729 |
| 8,960,719 B2 * | 2/2015 | Iida | B60R 21/23138 280/730.2 |
| 9,126,560 B2 * | 9/2015 | Fujiwara | B60R 21/207 |
| 9,290,148 B2 * | 3/2016 | Hotta | B60R 21/2171 |
| 9,505,369 B2 * | 11/2016 | Iida | B60R 21/2338 |
| 9,616,841 B2 * | 4/2017 | Futai | B60R 21/233 |
| 2016/0375851 A1 * | 12/2016 | Futai | B60R 21/2338 280/728.2 |

* cited by examiner

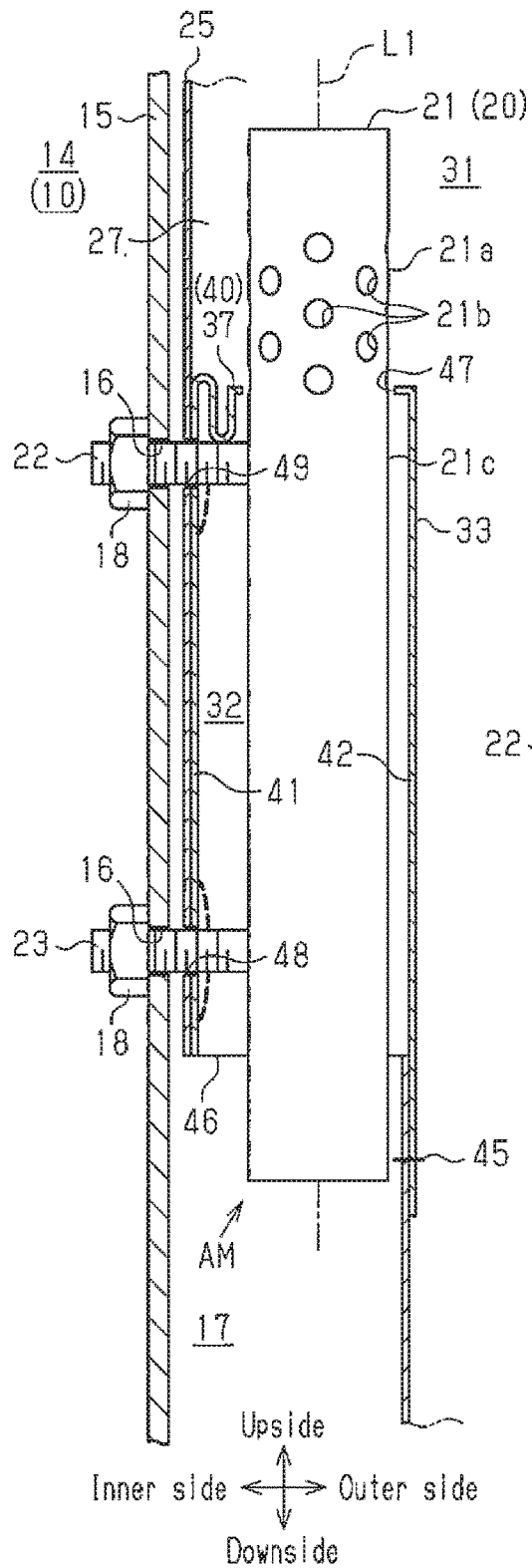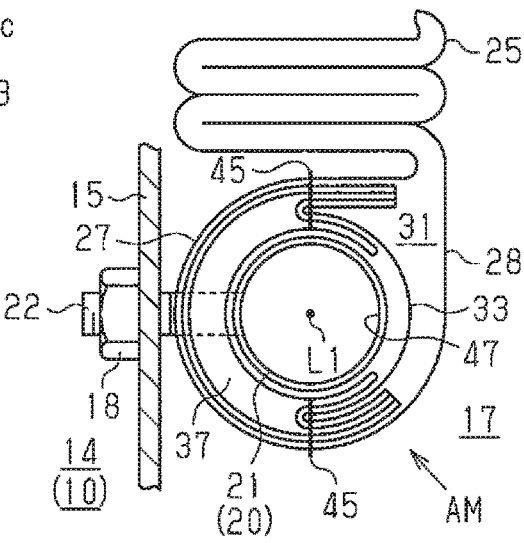

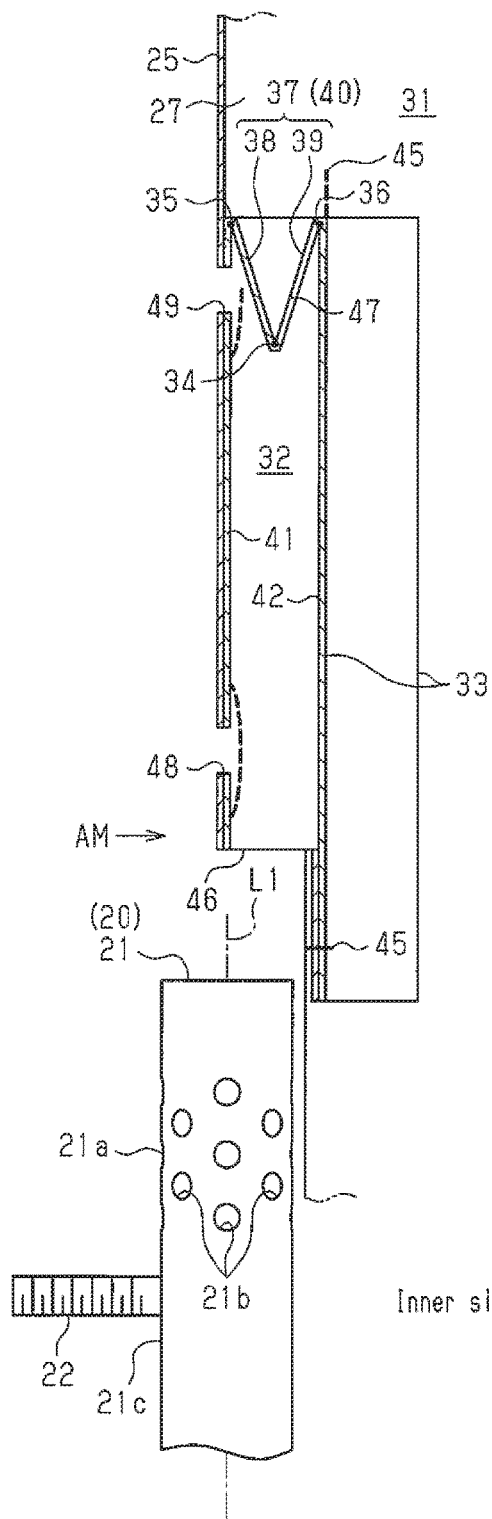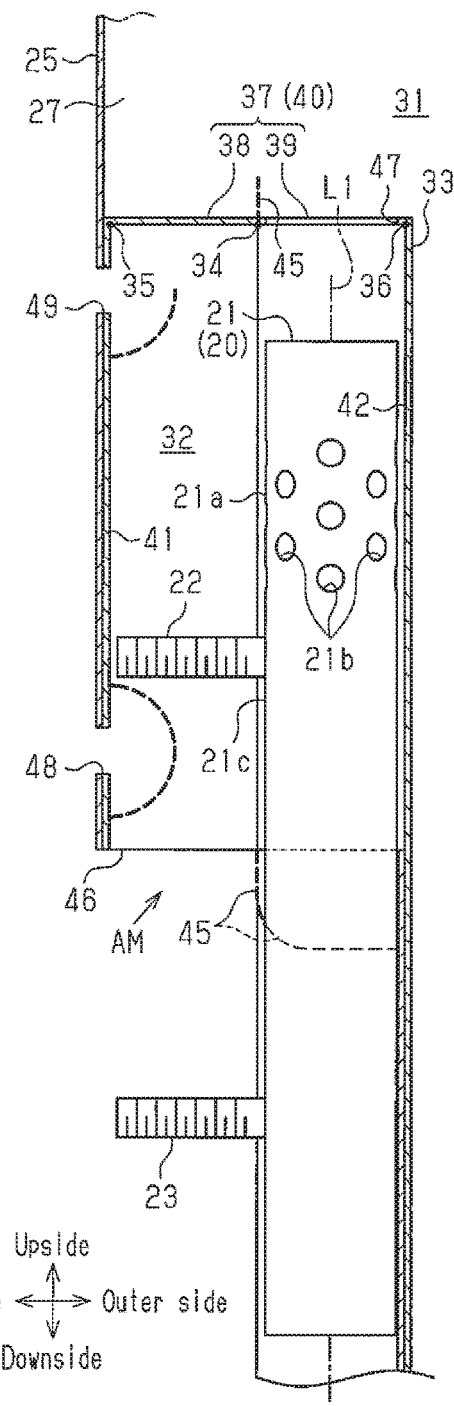

Upside
Inner side ↔ Outer side
Downside

AIRBAG APPARATUS

BACKGROUND OF THE INVENTION

The present invention relates to an airbag apparatus that protects an occupant from an impact by deploying and inflating an airbag at a position close to the occupant seated in a vehicle seat when an impact due to, for example, a collision is applied to the vehicle.

An airbag apparatus is effective for protecting an occupant from an impact when an impact due to, for example, a collision is applied to an automobile. As one form of the airbag apparatus, for example, Japanese Laid-Open Patent Publication No. 2014-69585 discloses an airbag apparatus including a gas generator and an airbag. The gas generator is elongated and includes a gas outlet portion at one end. The airbag includes an inflation portion that is inflated by inflation gas ejected from the gas outlet portion.

The airbag has a tubular storage chamber for storing the gas generator outside the inflation portion. More specifically, the airbag is configured by a first base fabric sheet. A second base fabric sheet is superposed the first base fabric sheet from the inner side. The first base fabric sheet and the second base fabric sheet are sewn together and an opening is provided in the first base fabric sheet to form a tubular storage chamber with opened opposite ends. The opening in the first base fabric sheet is an insertion port for the gas generator. The gas generator is inserted into the storage chamber through the insertion port.

The airbag further includes a pair of restrictions. The restrictions are formed by sewing the first base fabric sheet and the second base fabric sheet to each other to be located between the insertion port and the gas outlet portion at positions on opposite sides of the gas generator in the radial direction. In the positions where the restrictions are provided, the gap between the inner wall surface of the storage chamber and the gas generator is smaller than in other portions. This limits leakage of inflation gas to the outside from inside the inflation portion through the storage chamber.

However, since a pair of restrictions disclosed in Japanese Laid-Open Patent Publication No. 2014-69585 is formed by sewing the first base fabric sheet and the second base fabric sheet together, the stiffness of the restrictions is increased. The restrictions thus resist deformation along the gas generator. Therefore, there is a limit in reducing the gap between the inner wall surface of the storage chamber and the gas generator at the positions where the restrictions are provided, and there is room for improvement in the sealing performance.

SUMMARY OF THE INVENTION

Accordingly, it is an objective of the present invention to provide an airbag apparatus that improves the performance of limiting leakage of inflation gas from inside an inflation portion through a storage chamber.

To achieve the foregoing objective and in accordance with one aspect of the present invention, an airbag apparatus is provided that includes a gas generator main body and an airbag. The gas generator main body includes a gas outlet portion and a non-outlet portion that is adjacent to and coaxial with the gas outlet portion. The gas outlet portion includes a plurality of gas discharging holes provided in an outer periphery of the gas outlet portion. The airbag includes an inflation portion that is inflated by inflation gas discharged from the gas discharging holes. The airbag includes a storage chamber that is arranged outside the inflation portion and stores the gas generator main body. The storage chamber is configured to be tubular by a storage wall portion. The storage chamber includes an insertion port for inserting the gas generator main body and a partition wall. The insertion port is provided at at least one end of the storage chamber. The partition wall is provided at another end of the storage chamber. The partition wall includes a pass-through portion through which the non-outlet portion is passed such that the gas discharging holes are positioned in the inflation portion. The partition wall separates the storage chamber and the inflation portion from each other. The partition wall restricts leakage of inflation gas in the inflation portion to the storage chamber through a gap between an inner wall surface of the pass-through portion and the non-outlet portion.

BRIEF DESCRIPTION OF THE DRAWINGS

FIG. 7A is a partial cross-sectional view of the embodiment, illustrating a state in which the gas generator is attached to the side frame portion of an automobile seat together with the airbag.

FIG. 7B is a cross-sectional plan view illustrating part of FIG. 7A.

FIG. 9A is a partial cross-sectional view of the embodiment, illustrating a portion including the storage chamber of the airbag before the gas generator is installed.

FIG. 9B is a partial cross-sectional view showing a state in which the gas generator is being inserted in the storage chamber of the embodiment.

DETAILED DESCRIPTION OF THE PREFERRED EMBODIMENTS

An airbag apparatus according to one embodiment will now be described with reference to the drawings. In the embodiment, the airbag apparatus is employed as an automobile side airbag apparatus.

In the following description, the direction in which an automobile 10 advances will be referred to as the front, and the reverse direction will be referred to as the rear. With the center of the width direction of the automobile 10 (the automobile width direction) used as a reference, a side closer to the center will be referred to as the inner side of the automobile 10, while a side farther from the center will be referred to as the outer side of the automobile 10.

It is provided that an average sized adult occupant is seated on an automobile seat 12 in a predetermined normal posture.

Figure 1:
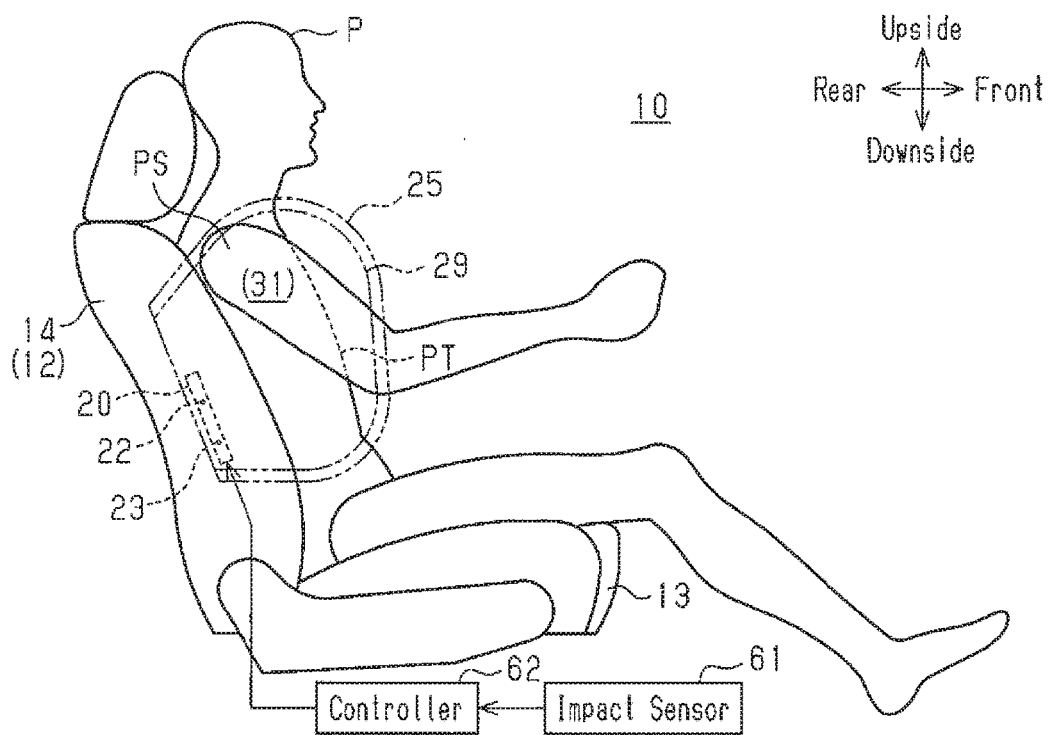
FIG. 1 is a side view of an automobile side airbag apparatus according to one embodiment, illustrating, together with an occupant, the apparatus installed in an automobile seat.

As shown in FIG. 1, the automobile seat 12 is arranged in the vicinity of the inner side of a body side portion of the automobile 10. The body side portion refers to an automobile component that is located in the side of the automobile 10, and mainly corresponds to doors and pillars. For example, the part of the body side portion corresponding to a front seat includes a front door and a center pillar (a B-pillar). The part of the body side portion corresponding to a rear seat includes a rear part of a side door (rear door), a C-pillar, a front part of a wheel well, and a rear quarter.

The automobile seat 12 includes a seat cushion 13 and a seat back 14, which is located behind the seat cushion 13 and extends diagonally upward and rearward. The automobile seat 12 is arranged in the automobile 10 such that the seat back 14 faces forward. The width direction of the thusly arranged automobile seat 12 coincides with the automobile width direction.

The seat back 14 incorporates a seat frame, which constitutes the framework of the seat back 14. Part of the seat frame is configured by a side frame portion 15, which is located in the outer-side portion of the seat back 14 as shown in FIGS. 7A and 7B.

The seat back 14 incorporates a storage portion 17 in a side portion on the outer side. The storage portion 17 accommodates an airbag module AM, which constitutes the main part of the side airbag apparatus. The airbag module AM includes as its main components a gas generator 20 and an airbag 25. Each of these components will now be described.

<Gas Generator 20>

The gas generator 20 is composed of a gas generator main body, which is the main part of the gas generator 20, and one or more mounting protrusions for mounting the gas generator main body to the side frame portion 15.

In the present embodiment, the gas generator main body is configured by an elongated inflator 21. As shown in FIG. 7A, the inflator 21 includes a columnar gas outlet portion 21a and a columnar non-outlet portion 21c. The non-outlet portion 21c is adjacent to and coaxial with the gas outlet portion 21a. The non-outlet portion 21c stores a gas generating agent (not shown), which generates inflation gas. The gas outlet portion 21a has gas discharging holes 21b for discharging inflation gas in the outer periphery. A harness (not shown), which is wiring for inputting activation signals to the inflator 21, is connected to one end (the lower end) of the non-outlet portion 21c on the opposite to the gas outlet portion 21a.

The inflator 21, which uses a gas generating agent, is generally referred to as the pyrotechnic type. In place of a pyrotechnic type inflator, it is possible to use a hybrid type inflator, which discharges inflation gas by breaking, with a low explosive, a partition wall of a high-pressure gas cylinder filled with high-pressure gas.

Bolts serving as mounting protrusions are provided on the outer circumferential surface of the non-outlet portion 21c. The bolts are located at two positions spaced apart (downward) from the gas outlet portion 21a in the direction along the axis L1 of the inflator 21. The bolts protrude in the same direction that is orthogonal to the axis L1. One of the bolts is located at a position below and adjacent to the gas outlet portion 21a. The distance between this bolt and the lower end of the gas outlet portion 21a is shorter than that in a typical inflator. The other bolt is located in a lower part of the non-outlet portion 21c. To distinguish the two bolts (the two mounting protrusions), the former bolt, which is below and adjacent to the gas outlet portion 21a, will be referred to as a specified mounting protrusion 22. The latter bolt, which is located in a lower part of the non-outlet portion 21c, will be referred to simply as a mounting protrusion 23. As the mounting protrusion 23, a member having a length shorter than or equal to that of the specified mounting protrusion 22 is used.

Since the specified mounting protrusion 22 is located at a position close to the gas outlet portion 21a as described above, the size of the inflator 21 along the axis L1 can be reduced.

<Airbag 25>

Figure 3A:
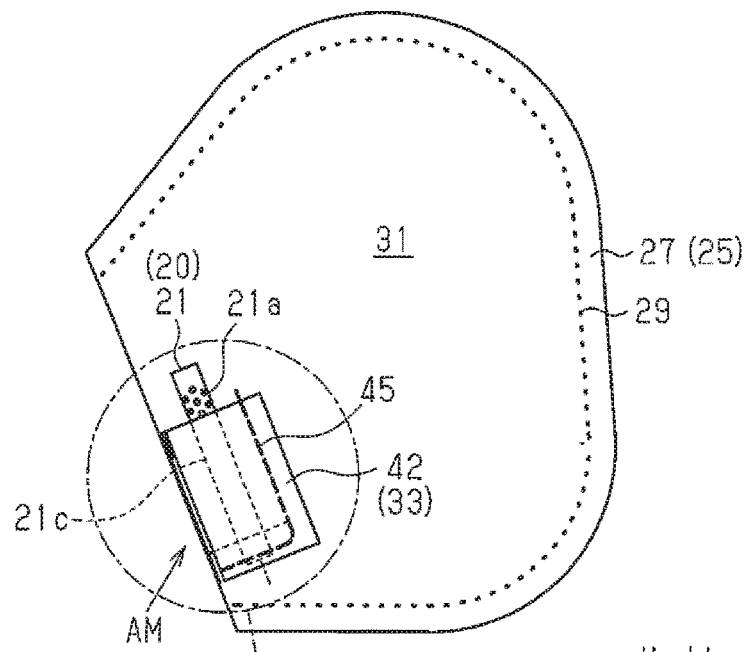
FIG. 3A is a cross-sectional side view illustrating the internal structure of the airbag module of the embodiment as viewed from the outer side of the automobile.
Figure 3B:
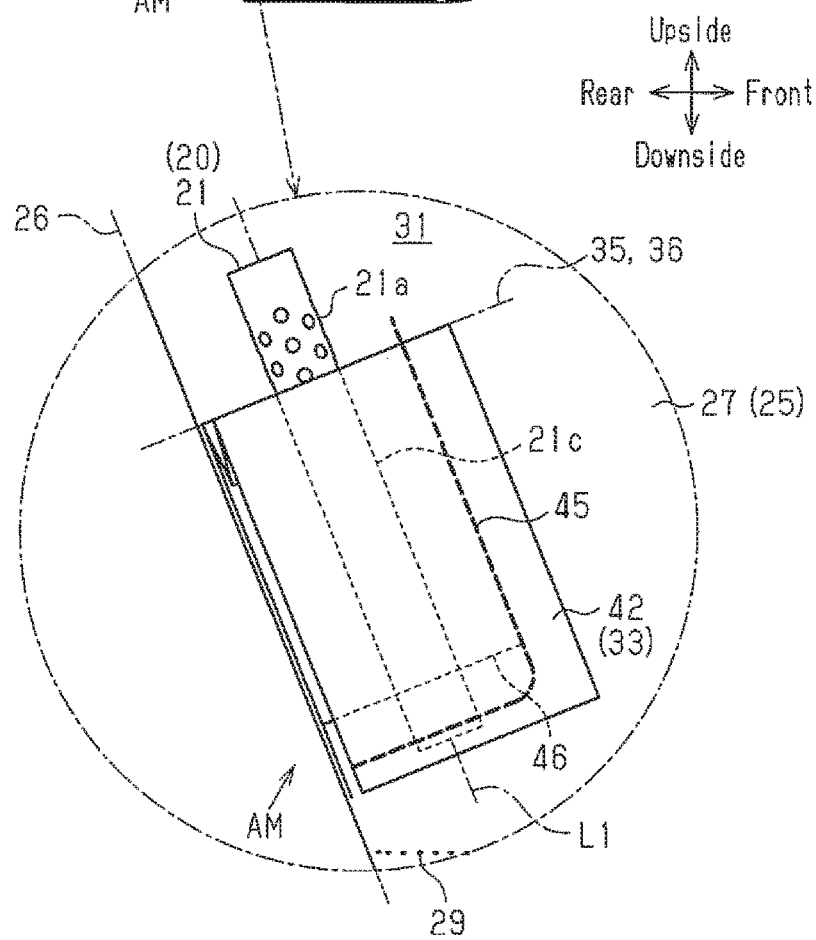
FIG. 3B is an enlarged partial cross-sectional side view illustrating part of FIG. 3A.
Figure 4A:
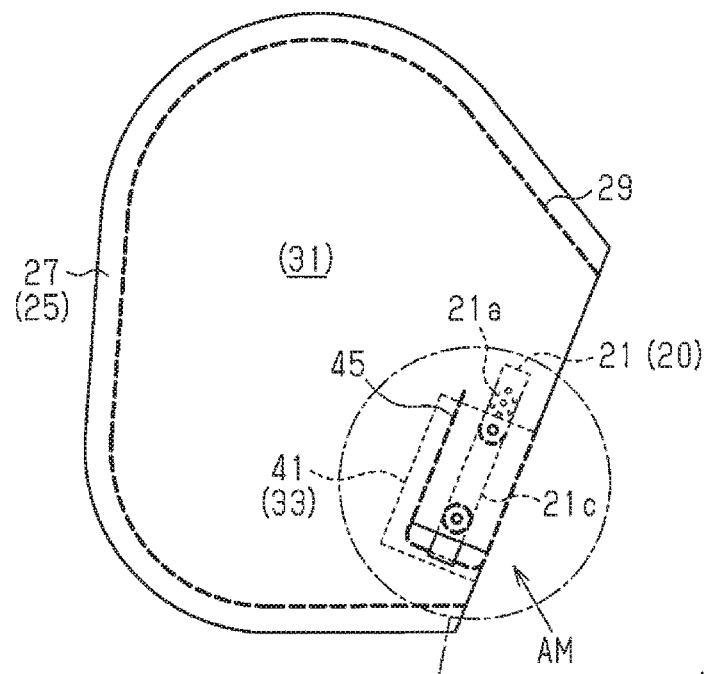
FIG. 4A is a side view illustrating the airbag module of the embodiment as viewed from the inner side of the automobile.
Figure 4B:
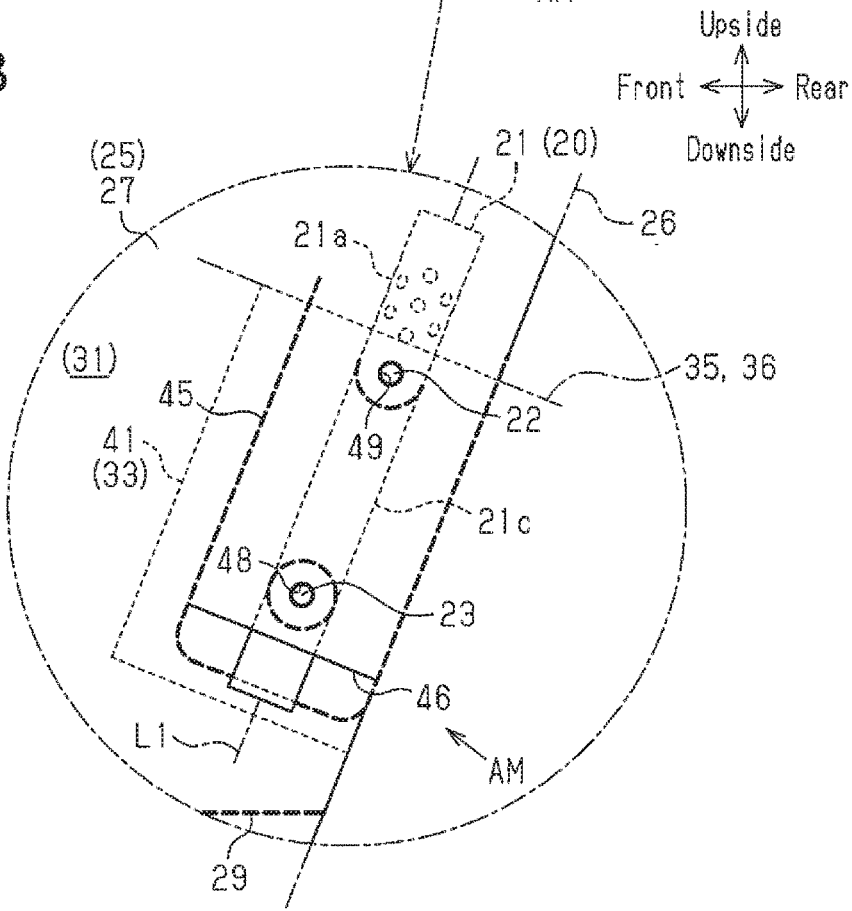
FIG. 4B is an enlarged partial side view illustrating part of FIG. 4A.
Figure 5A:
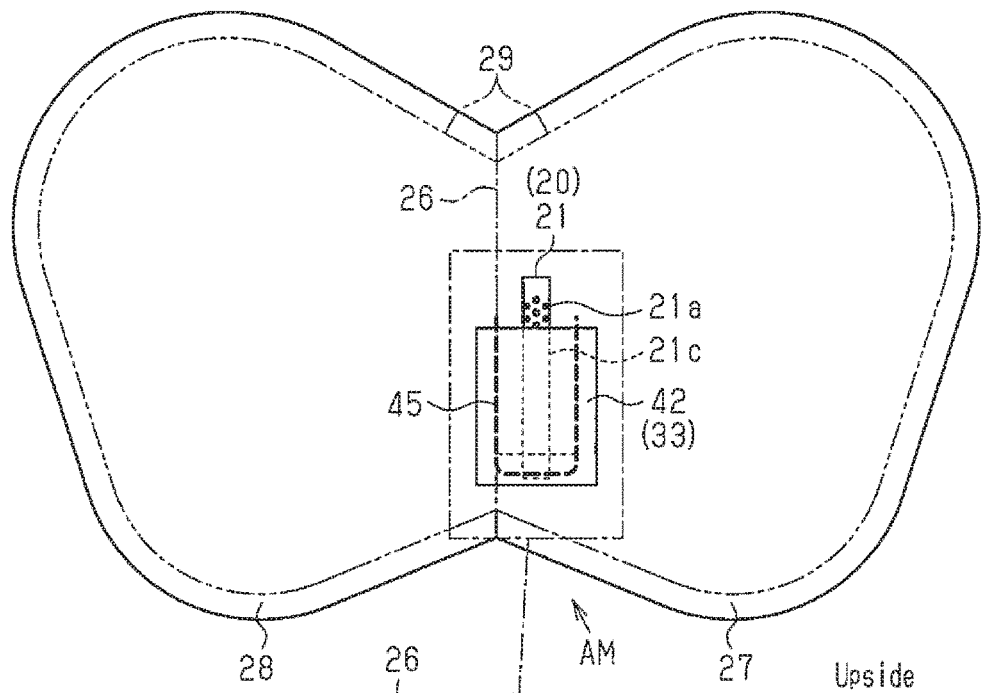
FIG. 5A is a developed view illustrating the airbag module of the embodiment in a state in which the airbag is spread flat with the peripheral joint portion disjoined.
Figure 5B:
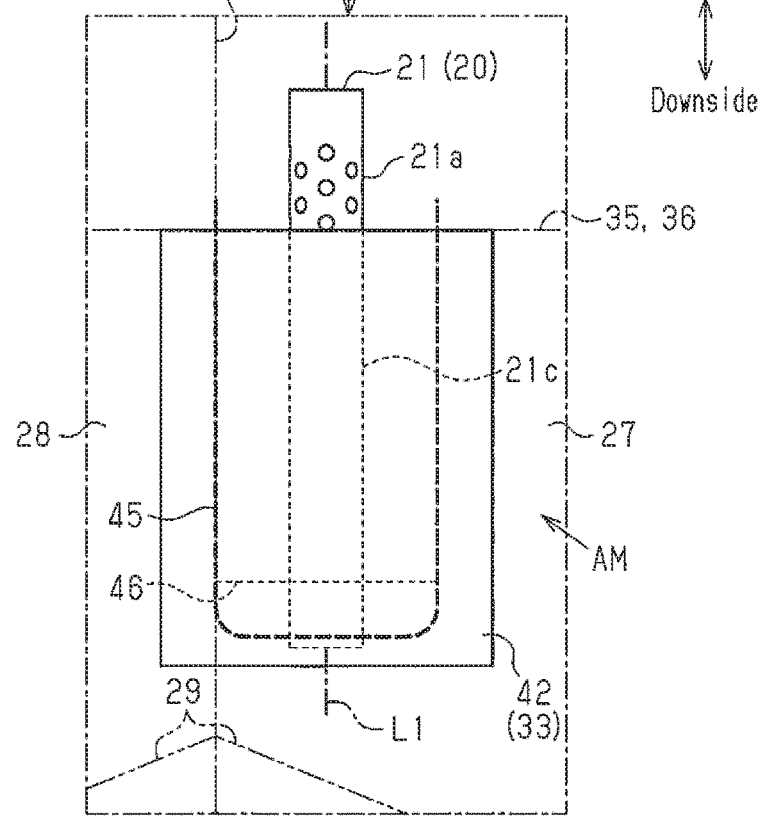
FIG. 5B is an enlarged developed view illustrating part of FIG. 5A.
Figure 6A:
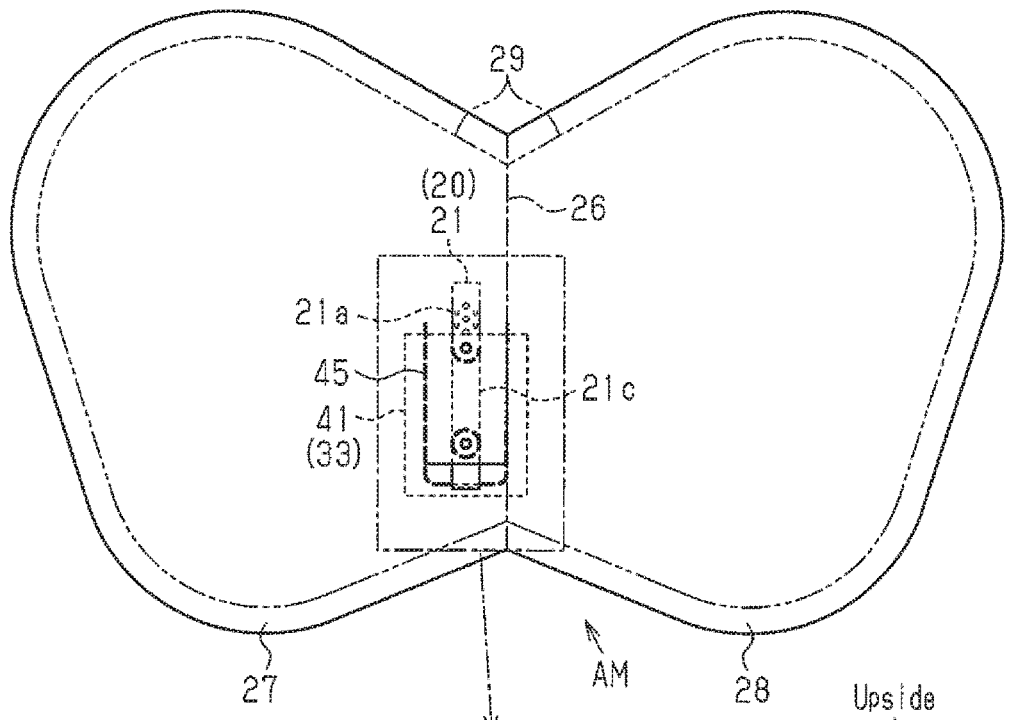
FIG. 6A is a developed view of the airbag module of FIG. 5A as viewed from the back side.
Figure 6B:
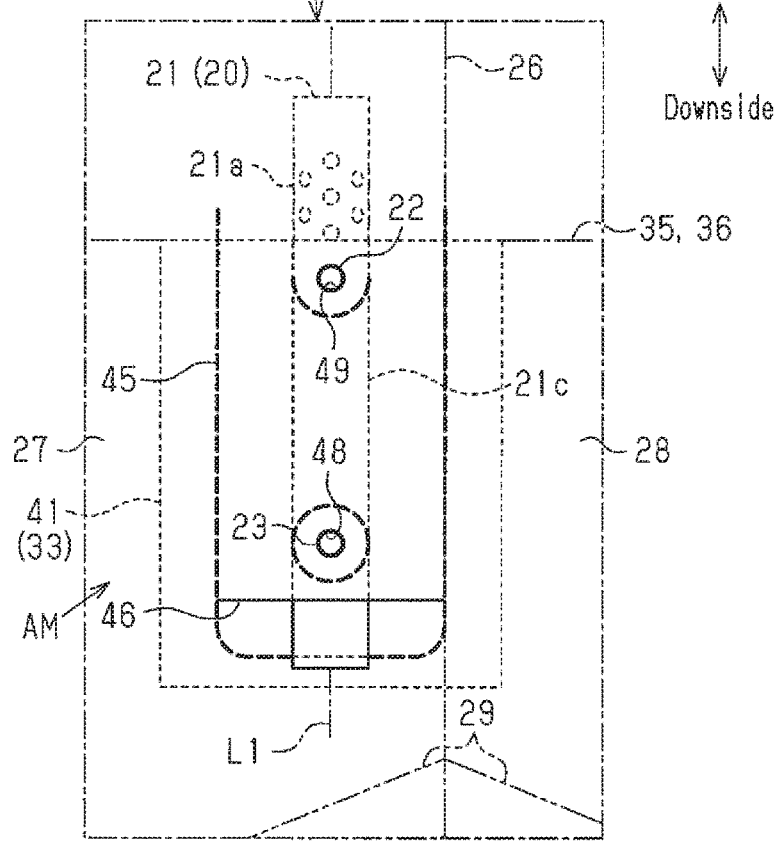
FIG. 6B is an enlarged developed view illustrating part of FIG. 6A.

FIGS. 4A and 4B show the airbag module AM with the airbag 25 in an uninflated-spread state, in which the airbag 25 is spread flat without being filled with inflation gas, as viewed from the inner side of the automobile. FIGS. 3A and 3B show the airbag module AM in which the airbag 25 is cut at the center in the automobile width direction to show the internal structure of the airbag module AM as viewed from the outer side of the automobile. FIGS. 5A and 5B show the airbag 25 in a state in which a peripheral joint portion 29 is disjoined and the airbag 25 is spread flat.

As shown in FIGS. 3A, 4A, and 5A, the main part of the airbag 25 is formed by folding a single fabric piece (also referred to as a base fabric sheet, or a fabric panel) along a fold line 26, which is a folding portion at the center in the width direction, to be superposed on itself in the automobile width direction, and joining the superposed parts. To distinguish the two superposed parts of the airbag 25, the part located on the inner side will be referred to as a first fabric portion 27, and the part located on the outer side will be referred to as a second fabric portion 28.

The first fabric portion 27 and the second fabric portion 28 are preferably made of a material having high strength and flexibility that can be folded easily. The material may be, for example, woven cloth made of polyester yarns or polyamide yarns.

The first fabric portion 27 and the second fabric portion 28 are joined to each other as described above at the peripheral joint portion 29 provided in the peripheral portion. In the present embodiment, the peripheral joint portion 29 is formed by sewing parts of the peripheral portion of the first and second fabric portions 27, 28 except for the rear end, in other words, except for the part in the vicinity of the fold line 26. Sewing is also performed on a joint portion 45, which will be discussed below.

The sewn portions are depicted by first to third different broken lines in FIGS. 3A to 7B and 9A to 10B. The first broken line includes thick line segments of a certain length arranged intermittently and represents sewn portions as viewed from the outer side or the inner side of the automobile (refer to the peripheral joint portion 29 in FIG. 4A). The second broken line includes thin line segments of a certain length that is longer than those in a typical broken line arranged intermittently, and represents the state of sewing threads that are located, for example, behind a fabric piece and cannot be seen directly (refer to the joint portion 45 in FIG. 9B). The third broken line includes dots arranged at predetermined intervals, and represents a state of sewing threads at positions between the first fabric portion 27 and the second fabric portion 28, which are sewn members (see the peripheral joint portion 29 in FIG. 3A). That is, diagrams depicted with the third broken lines show the structure along the cross-section that passes through the sewn portions.

The peripheral joint portion 29 may be formed by a method other than sewing using sewing threads as described above, but may be formed by, for example, using adhesive. Such modification is also applicable to the joint portion 45.

As shown in FIG. 7A, the airbag 25 includes an inflation portion 31 and a tubular storage chamber 32. The inflation portion 31 is inflated by inflation gas discharged from the gas outlet portion 21a. The storage chamber 32 stores the inflator 21 and is located outside the inflation portion 31.

Figure 2A:
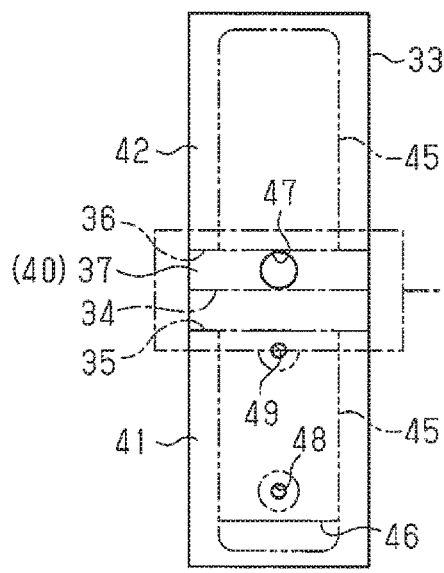
FIG. 2A is a developed view illustrating a storage fabric sheet of the embodiment before being folded.
Figure 2B:
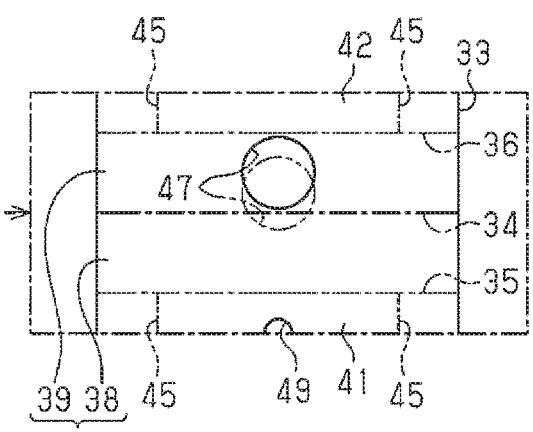
FIG. 2B is an enlarged developed view illustrating part of FIG. 2A.

To form the inflation portion 31 and the storage chamber 32, one vertically elongated storage fabric sheet 33 made of the same material as that of the first fabric portion 27 and the second fabric portion 28 is used. FIG. 2A shows the storage fabric sheet 33 before being folded. As shown in FIGS. 2A, 2B, and 9A, a valley fold line 34, which is a first bending portion, is provided in the central portion in the longitudinal direction of the storage fabric sheet 33. The valley fold line 34 extends in the width direction (the lateral direction in FIGS. 2A and 2B). Two mountain fold lines 35, 36, which are second bending portions, are provided at the central portion of the storage fabric sheet 33 in the longitudinal direction and at positions on the opposite sides of the valley fold line 34 in the longitudinal direction. The mountain fold lines 35, 36 extend in the width direction of the storage fabric sheet 33.

In the storage fabric sheet 33, the portion between the mountain fold lines 35, 36 constitutes a partition wall 37 separating the storage chamber 32 and the inflation portion 31 from each other. Part of the partition wall 37 between the valley fold line 34 and the mountain fold line 35 constitutes a superposed portion 38. Part of the partition wall 37 between the valley fold line 34 and the mountain fold line 36 constitutes a superposed portion 39. The superposed portions 38, 39 are bendably connected to each other via the first bending portion (the valley fold line 34). The superposed portions 38, 39 bent and superposed on each other at the first bending portion (the valley fold line 34) constitute an extendable portion 40, which can be extended and contracted in the longitudinal direction of the specified mounting protrusion 22.

The storage fabric sheet 33 has two sections that sandwich the partition wall 37 from the opposite sides in the longitudinal direction of the storage fabric sheet 33. One of these sections that is adjacent to the mountain fold line 35 constitutes a storage wall portion 41, and the one adjacent to the mountain fold line 36 constitutes a storage wall portion 42.

The superposed portion 38 and the storage wall portion 41 are bendably connected to each other via a second bending portion (the mountain folding line 35), and the superposed portion 39 and the storage wall portion 42 are bendably connected to each other via a second bending portion (the mountain fold line 36).

Figure 8:
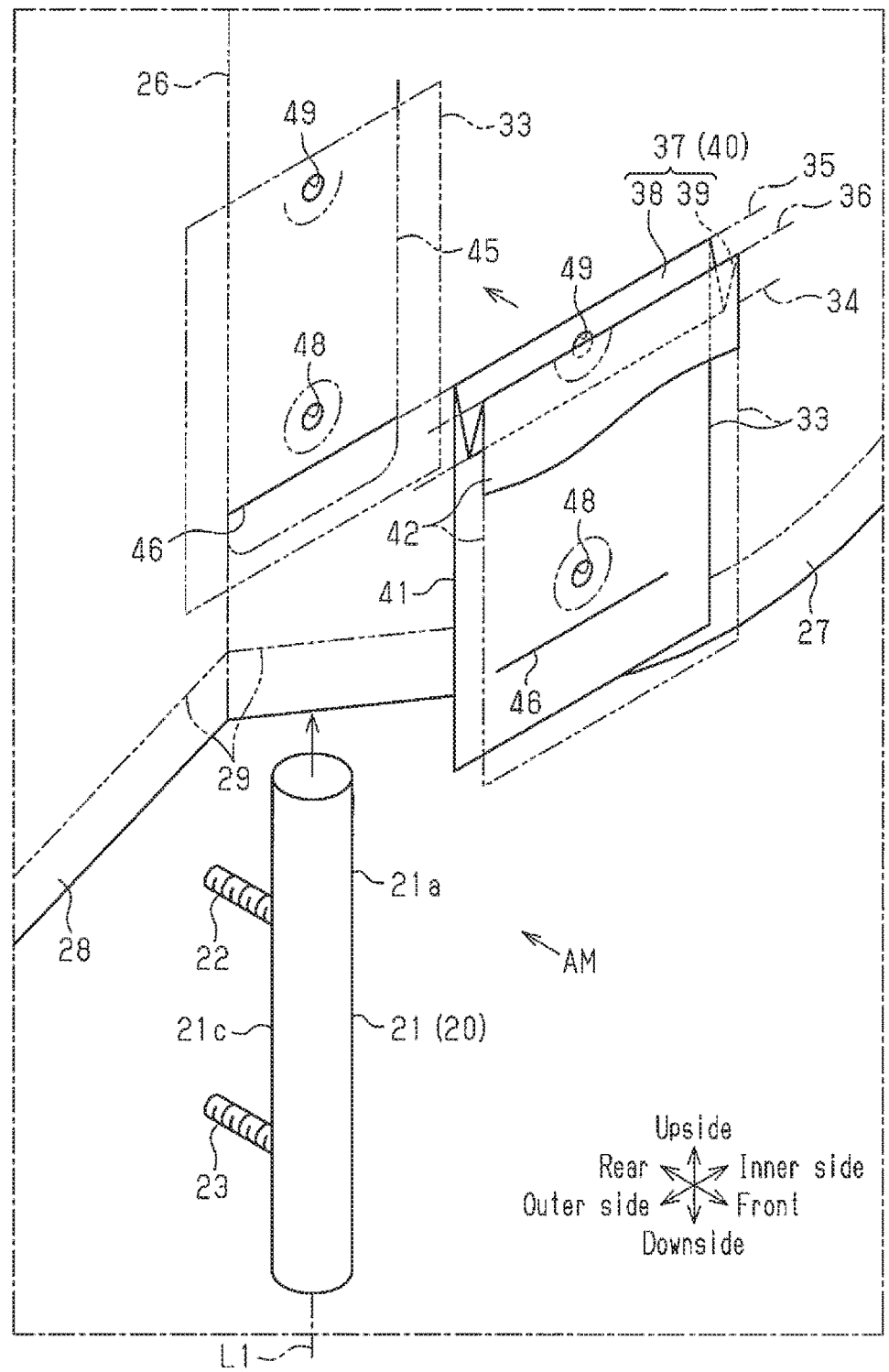
FIG. 8 is an exploded partial perspective view illustrating components of the airbag module of the embodiment.

As shown in FIG. 8, the storage fabric sheet 33 is accordion-folded by being valley-folded along the valley fold line 34 and mountain-folded along the mountain fold lines 35, 36. The superposed portions 38, 39 and the storage wall portions 41, 42 are stacked in the thickness direction thereof. The thickness direction coincides with the longitudinal direction of the specified mounting protrusion 22. The superposed portions 38, 39 are located between the storage wall portions 41, 42 and respectively connected to the upper ends of the storage wall portions 41, 42.

The storage fabric sheet 33 is reduced in the longitudinal size by being accordion-folded as described above (see FIG. 8). As shown in FIGS. 5A, 5B, 6A, and 6B, the storage fabric sheet 33 is located between the first fabric portion 27 and the second fabric portion 28 and crosses the fold line 26. The accordion-folded storage fabric sheet 33 is joined to the first fabric portion 27 and the boundary between the first fabric portion 27 and the second fabric portion 28 by the joint portion 45, which is substantially U-shaped and provided along the periphery of the storage fabric sheet 33 except for the upper edge. That is, most of the joint portion 45 joins most of the storage fabric sheet 33 to the first fabric portion 27. Part of the joint portion 45 is located on the fold line 26.

As shown in FIGS. 4A, 4B, 5A, and 5B, the inflation portion 31 of the airbag 25 is located in a space that is located between the first fabric portion 27 and the second fabric portion 28 and surrounded by the peripheral joint portion 29. As shown in FIG. 1, the inflation portion 31 is deployed and inflated on the side of part of the upper body of the occupant P, more specifically, on the side of the region from the thorax region PT to the shoulder region PS, thereby restraining the same region to protect it from impact. As shown in FIG. 7A, the storage wall portion 42 of the storage fabric sheet 33 constitutes part of the storage chamber 32 and part of the inflation portion 31.

The main part of the storage chamber 32 is defined by a space that is located between the storage wall portions 41, 42 of the storage fabric sheet 33 and surrounded by the joint portion 45 and the partition wall 37. A region of the first fabric portion 27 to which the storage wall portion 41 is joined also constitutes part of the storage chamber 32. The storage chamber 32 configured as described above has a tubular shape extending in the vertical direction outside the inflation portion 31.

As shown in FIGS. 5A and 5B, the first fabric portion 27, the folding portion (fold line 26), and the second fabric portion 28 are formed of a common fabric sheet. As shown in FIGS. 9A and 9B, the superposed portions 38, 39 and the storage wall portions 41, 42 are bent at the bending portions (the valley fold line 34 and the mountain fold lines 35, 36) to be stacked in the thickness direction between the first fabric portion 27 and the second fabric portion 28.

As shown in FIG. 8, the storage wall portion 41 has an insertion port 46 for the inflator 21 in a lower part. Also, the region of the first fabric portion 27 to which the storage wall portion 41 is joined by the joint portion 45 has an insertion port 46 for the inflator 21 in a lower part. The insertion ports 46 are slits that extend from the folding portion (the fold line 26) in a direction perpendicular to the folding portion (the fold line 26) and away from the second fabric portion 28.

The length of the insertion ports 46 (slits) are set to allow the gas generator 20 to be inserted.

As shown in FIGS. 2A and 2B, part of the partition wall 37 is provided with a pass-through portion 47 through which the non-outlet portion 21c is passed such that the gas discharging holes 21b are positioned in the inflation portion 31. The pass-through portion 47 is configured by a circular hole the size of which is set such that the inner wall surface closely contacts the outer circumferential surface of the non-outlet portion 21c. In the present embodiment, the storage fabric sheet 33 is made of fabric and has some elasticity. Thus, the inner diameter of the pass-through portion 47 is set equal to or slightly smaller than the outer diameter of the non-outlet portion 21c.

The partition wall 37 is assumed to be divided into a region close to mounting holes 48, 49, which will be discussed below, relative to the valley fold line 34 (the first bending portion) and a region far from the mounting holes 48, 49 relative to the valley fold line 34 (the first bending portion). In this case, the center of the pass-through portion 47, which is a circular hole, is positioned in the region of the partition wall 37 that is relatively far from the mounting holes 48, 49. The superposed portion 38 is located in the region of the partition wall 37 that is relatively close to the mounting holes 48, 49. The superposed portion 39 is located in the region of the partition wall 37 that is relatively far from the mounting holes 48, 49. In the present embodiment, the pass-through portion 47 is entirely located in the superposed portion 39, which is farther from the mounting holes 48, 49 than the superposed portion 38. That is, the pass-through portion 47 is entirely located in the superposed portion 39, which is closer to the storage wall portion 42 than the superposed portion 38.

As shown in FIGS. 7A and 7B, the partition wall 37 has a function of separating the storage chamber 32 and the inflation portion 31 from each other as described above. The partition wall 37 also has a function of restricting leakage of the inflation gas in the inflation portion 31 to the storage chamber 32 through the gap between the inner wall surface of the pass-through portion 47 and the outer circumferential surface of the non-outlet portion 21c.

As shown in FIGS. 9A and 9B, the storage wall portion 41, which is farther from the inflation portion 31 than the storage wall portion 42, and the region of the first fabric portion 27 that is superposed on the storage wall portion 41 have the mounting holes 48, 49. The mounting holes 48, 49 are located in positions on the leading side of the insertion ports 46 in the insertion direction of the gas generator 20. In the present embodiment, the mounting holes 48, 49 are located in two positions of the storage wall portion 41 between the insertion ports 46 and the pass-through portion 47. The mounting holes 48, 49 are also located in two positions in the region of the first fabric portion 27 that is superposed on the storage wall portion 41 between the insertion ports 46 and the pass-through portion 47. As shown in FIG. 7A, the mounting hole 49 is provided in the parts of the storage wall portion 41 and the first fabric portion 27 that face the specified mounting protrusion 22 when the part of the non-outlet portion 21c at the boundary with the gas outlet portion 21a is surrounded by the pass-through portion 47. The mounting hole 48 is provided in the parts of the storage wall portion 41 and the first fabric portion 27 that face the mounting protrusion 23 in the same state as described above.

The airbag module AM is made compact as shown in FIG. 7B by folding the airbag 25 in the uninflated-spread state shown in FIG. 4A. The airbag module AM is folded in this manner to be suitably stored in the storage portion 17, which has a limited size in the seat back 14. The airbag module AM with the folded airbag 25 is held in the storage form by a holder such as a binding tape (not shown).

The airbag module AM held in the storage form is arranged in the storage portion 17. As shown in FIGS. 7A and 7B, the specified mounting protrusion 22 and the mounting protrusion 23 are respectively passed through holes 16 in the side frame portion 15. The gas generator 20 is fixed to the side frame portion 15 together with the airbag 25 by fastening nuts 18 to the specified mounting protrusion 22 and the mounting protrusion 23.

As shown in FIG. 1, the side airbag apparatus includes an impact sensor 61 and a controller 62 in addition to the above described airbag module AM. The impact sensor 61 is formed by an acceleration sensor and the like. The impact sensor 61 is installed in the body side portion of the automobile 10 to detect an impact applied to the body side portion from the outer side. The controller 62 controls operation of the inflator 21 based on a detection signal from the impact sensor 61.

Furthermore, the automobile 10 is equipped with a seat belt apparatus for restraining the occupant P seated on the automobile seat 12. Illustration of the seat belt apparatus is omitted in FIG. 1.

Operation of the side airbag apparatus according to the above-described embodiment will now be described.

First, a procedure for mounting the gas generator 20 to the airbag 25 will be described.

As shown in FIG. 9A, when mounting the gas generator 20 to the airbag 25, it is necessary to bring the specified mounting protrusion 22 close to the mounting hole 49 and bring the mounting protrusion 23 close to the mounting hole 48, while inserting the gas generator 20 into the storage chamber 32 through the opened insertion ports 46. This requires that, in the storage chamber 32, the dimension in the direction orthogonal to the axis L1 of the inflator 21 of the region at least between the insertion ports 46 and the mounting hole 49 be set to a dimension that allows insertion of the gas generator 20 as shown in FIG. 9B.

In the present embodiment, the specified mounting protrusion 22 is located close to the gas outlet portion 21a, and the mounting hole 49 is located at a position close to the partition wall 37. Thus, the partition wall 37 affects the size of the storage chamber 32 in the direction orthogonal to the axis L1. That is, if the dimension of the partition wall 37 were smaller than the appropriate value, the size of the storage chamber 32 in the direction orthogonal to the axis L1 in the region between the insertion ports 46 and the mounting hole 49 would be smaller than the size that allows insertion of the gas generator 20.

In this respect, the partition wall 37 of the present embodiment includes the extendable portion 40, which is composed of a pair of the superposed portions 38, 39. Thus, in the partition wall 37, changing the angle defined by the adjacent superposed portions 38, 39 at the first bending portion (the valley fold line 34) allows the extendable portion 40 to be extended or contracted in the longitudinal direction of the specified mounting protrusion 22.

Accordingly, the extendable portion 40 is extended before the specified mounting protrusion 22 is passed through the mounting hole 49. This increases the dimension of the storage chamber 32 in the direction orthogonal to the axis L1 to a dimension that allows insertion of the gas generator 20 in the region between the insertion ports 46 and the mounting hole 49. Thus, the gas generator 20 is inserted in the storage chamber 32 without any trouble so that the specified mounting protrusion 22 is guided to the mounting hole 49 and the mounting protrusion 23 is guided to the mounting hole 48.

On the other hand, the pass-through portion 47, which is made of a hole, is entirely located in the superposed portion 39, which is farther from the mounting hole 49 (closer to the inflation portion 31) than the superposed portion 38. The superposed portion 39 is adjacent to the storage wall portion 42.

Figure 10A:
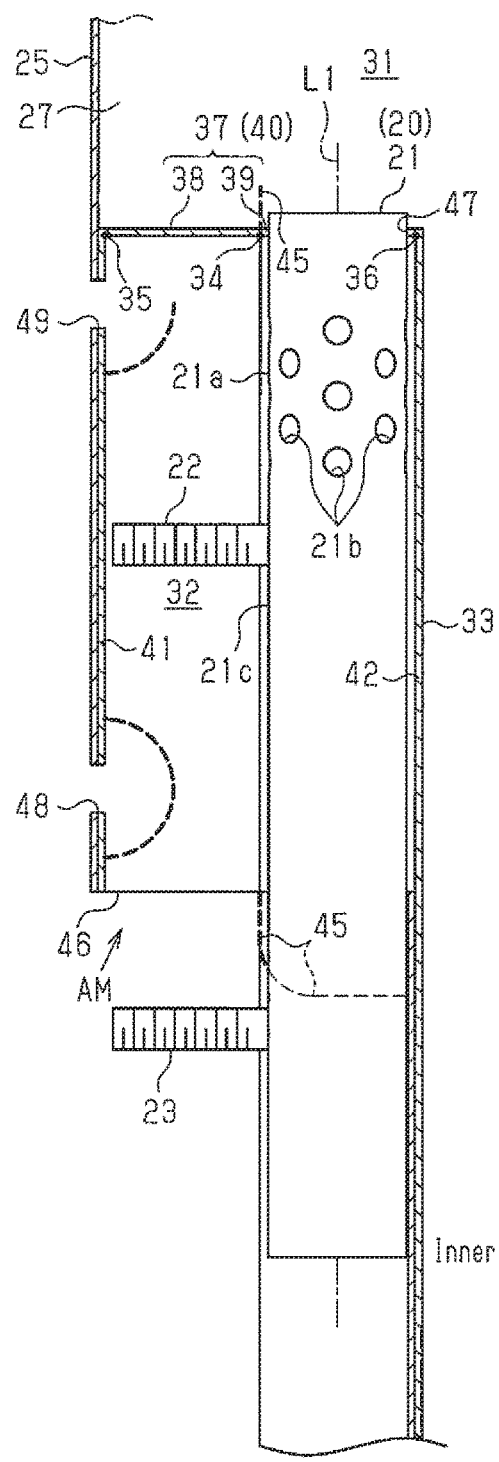
FIG. 10A is a partial cross-sectional view showing a state in which the gas outlet portion of FIG. 9B starts being passed through a pass-through portion.
Figure 10B:
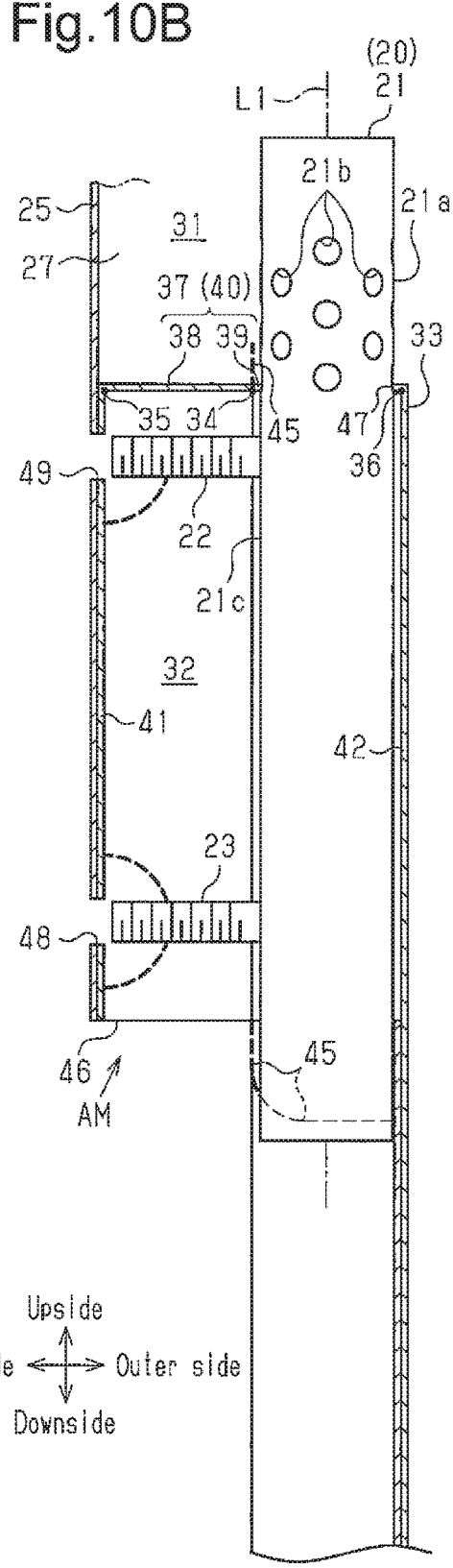
FIG. 10B is a partial cross-sectional view showing a state in which the non-outlet portion has been passed through the pass-through portion.

Accordingly, the orientation of the gas generator 20 is adjusted such that the specified mounting protrusion 22 extends toward the storage wall portion 41. As shown in FIG. 9B, the gas generator 20 is inserted into the storage chamber 32 through the insertion ports 46 along the storage wall portion 42. This extends the extendable portion 40, so that the dimension of the storage chamber 32 in the direction orthogonal to the axis L1 is increased to a dimension that allows insertion of the gas generator 20 in the region between the insertion ports 46 and the mounting hole 49. As shown in FIGS. 10A and 10B, it is possible to guide the gas outlet portion 21a to the pass-through portion 47, guide the specified mounting protrusion 22 to the mounting hole 49, and guide the mounting protrusion 23 to the mounting hole 48.

As shown in FIG. 10B, when the part of the non-outlet portion 21c at the boundary with the gas outlet portion 21a is passed through the pass-through portion 47, all the gas discharging holes 21b are located in the inflation portion 31. The partition wall 37 does not have a structure for increasing the stiffness of the portion around the pass-through portion 47 like the sewn portion in Japanese Laid-Open Patent Publication No. 2014-69585. The inner wall surface of the pass-through portion 47 is more likely to be deformed along the outer circumferential surface of the non-outlet portion 21c than when the stiffness is increased. Therefore, the gap created between the non-outlet portion 21c and the inner wall surface of the pass-through portion 47 is reduced as compared to that in Japanese Laid-Open Patent Publication No. 2014-69585, in which the stiffness is increased so that deformation is unlikely to occur.

In the present embodiment, the pass-through portion 47 is configured by a circular hole corresponding to the outer shape of the columnar non-outlet portion 21c. Therefore, as compared with a case in which the pass-through portion 47 has another shape, it is easy to cause the inner wall surface of the pass-through portion 47 to closely contact the outer circumferential surface of the non-outlet portion 21c.

In addition, in the present embodiment, the inner diameter of the pass-through portion 47 is set to be equal to or slightly smaller than the outer diameter of the non-outlet portion 21c. Therefore, in a state where the non-outlet portion 21c is passed through the pass-through portion 47, the inner wall surface of the pass-through portion 47 is brought into close contact with the outer circumferential surface of the non-outlet portion 21c. The gap between the non-outlet portion 21c and the inner wall surface of the pass-through portion 47 is the minimum possible size or a size close to the minimum size.

As described above, when the part of the non-outlet portion 21c at the boundary with the gas outlet portion 21a is passed through the pass-through portion 47, the specified mounting protrusion 22 faces the mounting hole 49, and the mounting protrusion 23 faces the mounting hole 48. This brings the gas generator 20 close to the storage wall portion 41. Then, while the partition wall 37 is contracted in the longitudinal direction of the specified mounting protrusion 22, the specified mounting protrusion 22 is passed through the mounting hole 49, and the mounting protrusion 23 is passed through the mounting hole 48. As a result, the gas generator 20 is mounted to the airbag 25 with the specified mounting protrusion 22 and the mounting protrusion 23 positioned outside the airbag 25 (the inflation portion 31 and the storage chamber 32).

Hereafter, operation of the side airbag apparatus of the present embodiment will be described.

When the impact sensor 61 does not detect any impact from the side of the body side portion, the controller 62 does not output to the inflator 21 an activation signal for activating the inflator 21. The inflator 21 thus does not discharge inflation gas. The airbag 25 thus remains stored in the storage portion 17 in the storage form with the gas generator 20 (see FIG. 7B).

In contrast, when the impact sensor 61 detects that an impact of a magnitude greater than or equal to a predetermined value has been applied to the body side portion due to a side collision or the like while the automobile 10 is traveling, the controller 62, based on the detection signal, outputs an activation signal for activating the inflator 21 to the inflator 21. In response to the activation signal, the inflator 21 discharges inflation gas through the gas discharging holes 21b of the gas outlet portion 21a.

The inflation gas is supplied to the inflation portion 31. At this time, since the gap between the inner wall surface of the pass-through portion 47 and the outer circumferential surface of the non-outlet portion 21c is small, the inflation gas supplied to the inflation portion 31 is unlikely to leak to the storage chamber 32.

The inflation portion 31 starts being inflated by the inflation gas supplied as described above. The inflation is carried out while canceling the folded state (deployment). The airbag 25 is projected forward from the seat back 14 with part thereof (a rear portion) remaining in the storage portion 17.

The airbag 25, which continues being supplied with inflation gas, is inflated while being unfolded (deployed) forward between the body side portion and the upper body of the occupant P seated in the automobile seat 12 (the region ranging from the shoulder region PS to the thorax region PT, see FIG. 1). Even at this time, only a small amount of inflation gas leaks to the storage chamber 32 through the gap between the inner wall surface of the pass-through portion 47 and the outer circumferential surface of the non-outlet portion 21c.

The thusly deployed and inflated airbag 25 is located between the upper body of the occupant P and the body side portion, which bulges into the passenger compartment. The airbag 25 pushes the upper body inward and restrains the upper body. The side impact transmitted to the upper body through the body side portion is reduced by the airbag 25 and the upper body is protected.

Figure 11:
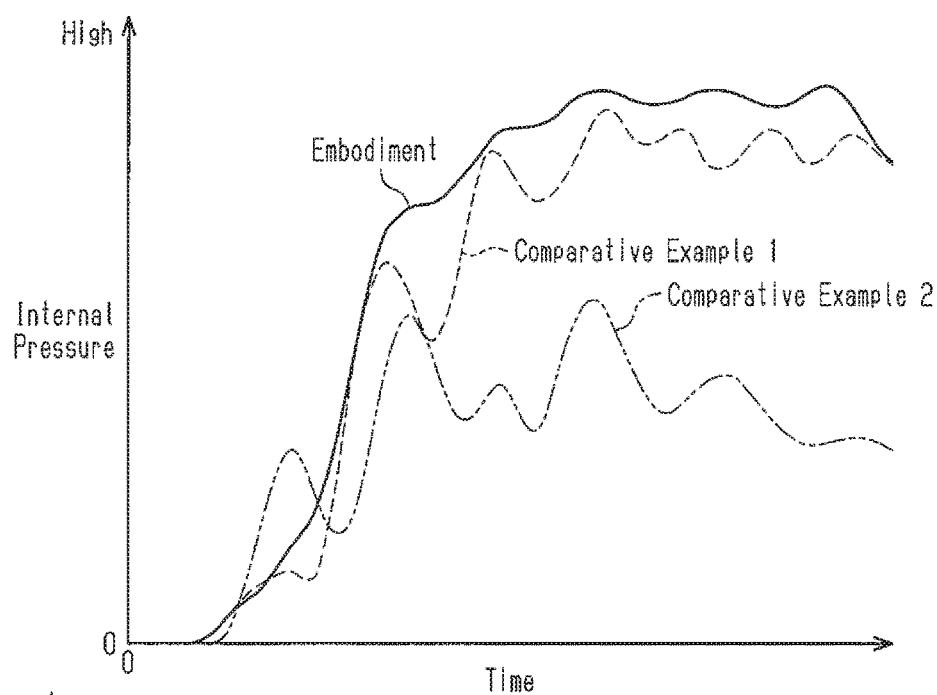
FIG. 11 is a graph showing measurement results of changes in the internal pressure of the inflation portion of the airbag.

The graph of FIG. 11 shows measurement results of changes over time in the internal pressure of the inflation portion 31 when deployed and inflated by being supplied with inflation gas. Comparative Example 1 in FIG. 11 shows a case of an airbag module that was formed by joining a first fabric portion and a second fabric portion to each other with the peripheral joint portion and incorporated an entire gas generator. The airbag had a pass-through portion through which the harness extending from an inflator was passed. The harness pass-through portion was smaller than the insertion port for the gas generator. In Comparative Example 2, an airbag module was produced by first manufacturing an airbag, and then inserting a gas generator through an insertion port formed in the airbag. Unlike the present embodiment, Comparative Example 2 did not include a partition wall having a pass-through portion.

In Comparative Example 1, leakage of inflation gas from the inflation portion was less than that in Comparative Example 2, and the maximum value of the internal pressure of the inflation portion was higher than in Comparative Example 2. The internal pressure of the present embodiment changed in a pressure zone as high as that in Comparative Example 1. This indicates that leakage of inflating gas from the inflation portion 31 in the present embodiment was as low as that in Comparative Example 1.

Figure 12:
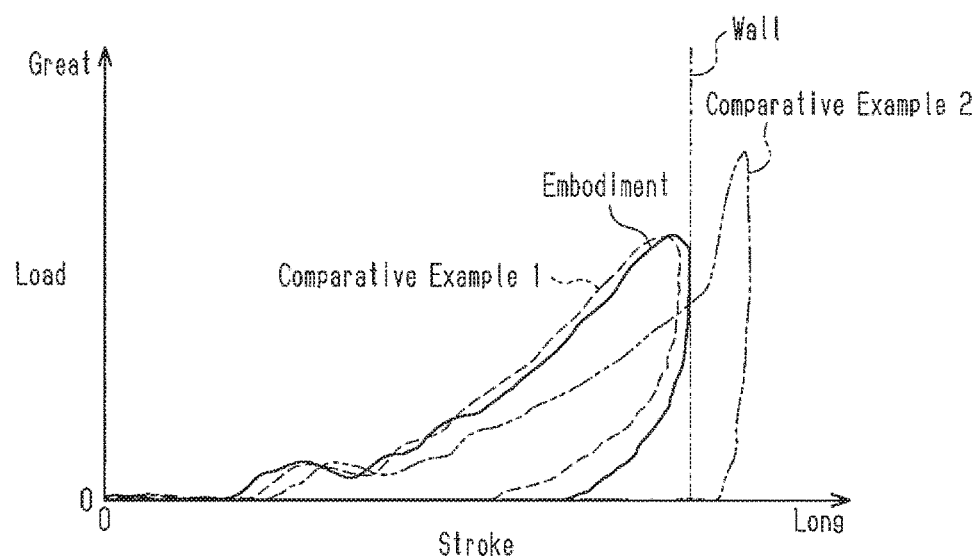
FIG. 12 is a graph showing measurement results of the relationship between the movement amount (stroke) of an impactor and load acting on the impactor when the impactor is moved toward a wall.

The graph of FIG. 12 shows the results of tests in which the airbag module with the airbag inflated was held between a wall and an impactor. Specifically, the graph shows the measurement results of the relationship between the movement amount (stroke) and the load applied to the impactor by the airbag when the impactor was moved toward the wall. The long dashed short dashed line indicates the position of the wall. Comparative Example 1 and Comparative Example 2 are the same as those described above.

In Comparative Example 1, a greater load was generated with smaller strokes than in Comparative Example 2, and the impact absorption amount was greater than that in Comparative Example 2. In the present embodiment, the characteristics of the loads in relation to the stroke was equivalent to that in Comparative Example 1.

The above-described embodiment may be modified as follows.

<Regarding Gas Generator 20>

The specified mounting protrusion 22 and the mounting protrusion 23 may be fixed directly to the non-outlet portion 21c as in the above illustrated embodiment. Alternatively, the mounting protrusions 22, 23 may be fixed indirectly. For example, a band-shaped auxiliary member (not shown) may be attached to the outer circumference of the non-outlet portion 21c, and the specified mounting protrusion 22 or the mounting protrusion 23 may be fixed to the auxiliary member.

The gas generator main body may be composed of the inflator 21, which has the gas outlet portion 21a and the non-outlet portion 21c, and a cylindrical retainer covering the non-outlet portion 21c. In this case, the retainer constitutes the outer peripheral portion of the gas generator main body. The retainer is fixed to the inflator 21 by swaging or the like. Of the specified mounting protrusion 22 and the mounting protrusion 23, at least the specified mounting protrusion 22 is provided in the retainer in place of the inflator 21.

As described above, when the gas generator main body is configured by the inflator 21 and the retainer, the gas generator main body is mounted to the airbag 25 in one of the following first and second modes.

First mode: the gas generator main body in which the inflator 21 is attached to the retainer is mounted to the airbag 25 by inserting the specified mounting protrusion 22 and the mounting protrusion 23 into the storage chamber 32 through the insertion ports 46.

Second mode: The retainer and the inflator 21 are separately mounted to the airbag 25. In this mode, firstly, the retainer is inserted into the storage chamber 32 at least together with the specified mounting protrusion 22 through the insertion ports 46, and the specified mounting protrusion 22 is passed through the mounting hole 49 to mount the retainer to the airbag 25. Thereafter, the inflator 21 is inserted into the retainer in the storage chamber 32 through the insertion ports 46, and the non-outlet portion 21c is passed through the pass-through portion 47 of the partition wall 37.

In either the first mode or the second mode, the gas generator is configured such that the specified mounting protrusion 22 projects from the outer periphery of the gas generator main body. Thus, the same operation and advantages as the above embodiment, in which the gas generator main body is configured only by the inflator 21, are achieved.

At least one of the specified mounting protrusion 22 and the mounting protrusion 23 may be changed to a member different from a bolt on condition that the member can fix the inflator 21 to the vehicle.

Two or more mounting protrusions 23 may be provided at a plurality of positions arranged along the axis L1 of the inflator 21 in the non-outlet portion 21c. When two or more mounting protrusions 23 are provided, all the mounting protrusions 23 may be secured to the side frame portion 15 in the same manner (for example, by fastening with bolts and nuts) or in different manners.

The mounting protrusion 23 may be omitted so that only the specified mounting protrusion 22 is used.

In the inflator 21, the position of the specified mounting projection 22 in the non-outlet portion 21c may be farther away from the gas outlet portion 21a in the direction along the axis L1 than in the above illustrated embodiment. In this case, the extendable portion 40 may be omitted from the partition wall 37.

This is because the influence of the partition wall 37 on the size of the storage chamber 32 in the direction orthogonal to the axis L1 is small even without the extendable portion 40. In the region between the insertion ports 46 and the mounting hole 49, the dimension of the storage chamber 32 in the direction orthogonal to the axis L1 can be made larger than the dimension that allows insertion of the inflator 21 and the specified mounting protrusion 22.

The non-outlet portion 21c does not necessarily need to be passed through the pass-through portion 47 such that all the gas discharging holes 21b are positioned in the inflation portion 31. That is, the non-outlet portion 21c may be passed through the pass-through portion 47 such that some of the gas discharging holes 21b that are close to the non-outlet portion 21c are surrounded by the pass-through portion 47.

<Regarding Inflation Portion 31>

The substantially entire airbag 25 may be configured by the inflation portion 31 as in the above-illustrated embodiment, but may also partially include a non-inflation portion, which is neither supplied with inflation gas nor inflated.

The inflation portion 31 may be divided into two or more chambers (inflation chambers).

<Regarding Partition wall 37>

The pass-through portion 47 may be formed by a slit in place of the hole.

The extendable portion 40 may be provided only on part of the partition wall 37.

The extendable portion 40 may be configured by superposed portions the number of which is greater than that in the above illustrated embodiment. That is, the extendable portion 40 may be configured by three or more superposed portions.

The partition wall 37 is divided into two regions on opposite sides of the valley fold line 34 (the first bending portion). The regions include a region relatively close to the mounting hole 49 and a region relatively far from the mounting hole 49. As long as the center of the pass-through portion 47 is located in the region relatively far from the mounting hole 49, the position of the pass-through portion 47 may be different from that in the above illustrated embodiment. For example, the pass-through portion 47 may be formed to cross the boundary between the superposed portions 38, 39 as indicated by the long dashed double-short dashed line in FIG. 2B.

The partition wall 37 may be arranged to correspond to part of the non-outlet portion 21c that is farther away from the gas discharging holes 21b than in the above illustrated embodiment.

<Regarding Insertion Ports 46>

The insertion ports 46 may be formed by holes in place of slits.

<Types of Applicable Airbag Apparatus>

The present invention may be applied to any airbag apparatuses other than a side airbag apparatus as long as that apparatus includes an elongated gas generator main body that has the gas outlet portion 21a and the non-outlet portion 21c, and the airbag 25, which includes an inflation portion 31 to be inflated by inflation gas discharged from the gas discharge holes 21b of the gas outlet portion 21a.

One example of such airbag apparatuses is an airbag apparatus for protecting knees, that is, a knee airbag apparatus. This type of airbag apparatus protects the region from the shins to the knees of the occupant by inflating an airbag in front of the lower front of the legs of the occupant seated on the vehicle seat.

In addition, the present invention may be applied to a seat cushion airbag apparatus. This type of airbag apparatus inflates an airbag installed in the seat cushion of a vehicle seat with inflation gas in response to impact applied to the vehicle to raise the seating face, thereby restricting forward movement of the occupant on the seat.

<Other Modifications>

The present invention may be applied to a side airbag apparatus of an automobile in which the seat 12 is arranged such that the seat back 14 faces in a direction other than the forward direction, for example, sideways. In this case, when an impact is applied to a side of the automobile seat 12 (in the front-rear direction of the automobile), the side airbag apparatus protects the occupant P from the impact.

The part of the upper body of the occupant P to be protected by the side airbag apparatus may be different from that in the above illustrated embodiment. In this case, the shape and size of the airbag 25 are changed to a shape and size that can protect the target portion of the occupant P.

Automobiles in which the above described airbag apparatus can be employed include various industrial vehicles in addition to private cars.

The above-described airbag apparatus may also be applied to an airbag apparatus installed in seats in vehicles other than automobiles, including aircraft and ships.

The invention claimed is:

1. An airbag apparatus comprising:
   a gas generator main body that includes
      a gas outlet portion, and
      a non-outlet portion that is adjacent to and coaxial with the gas outlet portion,
      wherein the gas outlet portion includes a plurality of gas discharging holes provided in an outer periphery of the gas outlet portion, and
   an airbag including an inflation portion that is inflated by inflation gas discharged from the gas discharging holes, wherein
   the airbag includes a storage chamber that is separated from the inflation portion and stores the gas generator main body,
   the storage chamber is configured to be tubular by a storage wall portion,
   the storage chamber includes
      an insertion port for inserting the gas generator main body, the insertion port being provided at at least one end of the storage chamber, and
      a partition wall provided at another end of the storage chamber, wherein the partition wall includes a pass-through portion through which the non-outlet portion is passed such that the gas discharging holes are positioned in the inflation portion,
   the partition wall separates the storage chamber and the inflation portion from each other, and
   the partition wall restricts leakage of inflation gas in the inflation portion to the storage chamber through a gap between an inner wall surface of the pass-through portion and the non-outlet portion,
   the gas generator main body and at least one mounting protrusion constitute a gas generator,
   the mounting protrusion is provided on the non-outlet portion at a position that is separated from the gas outlet portion in a direction along an axis of the gas generator main body, the mounting protrusion protruding in a direction orthogonal to the axis,
   the mounting protrusion is used for mounting at least an outer peripheral portion of the non-outlet portion to a vehicle,
   the storage wall portion includes a mounting hole located between the pass-through portion and the insertion port, the mounting hole being located on part of the storage wall portion that is on an opposite side to the inflation portion, and
   the mounting protrusion is passed through the mounting hole,
   the at least one mounting protrusion includes a specified mounting protrusion that is provided at least on the outer peripheral portion of the non-outlet portion, the specified mounting protrusion being located at a position on the non-outlet portion that is adjacent to the gas outlet portion in the direction along the axis,
   the partition wall is arranged between the specified mounting protrusion and the gas outlet portion in a state in which the specified mounting protrusion is passed through the mounting hole, and
   at least part of the partition wall is configured by an extendable portion configured to be capable of extending and contracting in a longitudinal direction of the specified mounting protrusion.

2. The airbag apparatus according to claim 1, wherein the pass-through portion is configured to have a size that allows the inner wall surface of the pass-through portion to closely contact the non-outlet portion.

3. The airbag apparatus according to claim 2, wherein the non-outlet portion has a columnar shape, and the pass-through portion is configured by a circular hole so that the inner wall surface closely contacts an outer circumferential surface of the non-outlet portion.

4. The airbag apparatus according to claim 3, wherein an inner diameter of the pass-through portion is smaller than an outer diameter of the non-outlet portion.

5. The airbag apparatus according to claim 1, wherein the extendable portion is configured by at least one bending portion and a plurality of superposed portions that are bent at the bending portion to be superposed on each other in the longitudinal direction of the mounting protrusion.

6. The airbag apparatus according to claim 5, wherein the superposed portions are a pair of superposed portions, the at least one bending portion includes a first bending portion that is located between the pair of the superposed portions, the pair of the superposed portions are bent via the first bending portion to be superposed on each other in the longitudinal direction of the mounting protrusion, the partition wall is divided into two regions on opposite sides of the first bending portion, the regions including a region relatively close to the mounting hole and a region relatively far from the mounting hole, and the pass-through portion is configured by a hole and is arranged such that a center of the hole is located in the partition wall in the region relatively far from the mounting hole.

7. The airbag apparatus according to claim 6, wherein the pass-through portion is entirely arranged in one of the superposed portions that is farther from the mounting hole.

8. An airbag apparatus comprising:
a gas generator main body that includes
    a gas outlet portion, and
    a non-outlet portion that is adjacent to and coaxial with the gas outlet portion,
    wherein the gas outlet portion includes a plurality of gas discharging holes provided in an outer periphery of the gas outlet portion, and an airbag including an inflation portion that is inflated by inflation gas discharged from the gas discharging holes, wherein the airbag includes a storage chamber that is separated from the inflation portion and stores the gas generator main body, the storage chamber is configured to be tubular by a storage wall portion, the storage chamber includes
    an insertion port for inserting the gas generator main body, the insertion port being provided at at least one end of the storage chamber, and
    a partition wall provided at another end of the storage chamber, wherein the partition wall includes a pass-through portion through which the non-outlet portion is passed such that the gas discharging holes are positioned in the inflation portion, the partition wall separates the storage chamber and the inflation portion from each other, the partition wall restricts leakage of inflation gas in the inflation portion to the storage chamber through a gap between an inner wall surface of the pass-through portion and the non-outlet portion, and the pass-through portion is formed in a single fabric sheet.

9. The airbag apparatus according to claim 8, wherein the partition wall is configured by the single fabric sheet.

* * * * *